United States Patent
Miwa et al.

(10) Patent No.: US 7,036,084 B2
(45) Date of Patent: Apr. 25, 2006

(54) INDUSTRIAL EQUIPMENT AND SYSTEM

(75) Inventors: Toshiharu Miwa, Aichi-ken (JP); Akio Arakawa, Aichi-ken (JP); Masanobu Sakai, Aichi-ken (JP); Makoto Yoshino, Aichi-ken (JP); Toru Ito, Aichi-ken (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 697 days.

(21) Appl. No.: 10/174,382

(22) Filed: Jun. 18, 2002

(65) Prior Publication Data

US 2003/0018654 A1 Jan. 23, 2003

(30) Foreign Application Priority Data

Jun. 19, 2001 (JP) .............................. 2001-185342

(51) Int. Cl.
  *G06F 12/00* (2006.01)
(52) U.S. Cl. ....................... 715/763; 715/765
(58) Field of Classification Search ................ 715/788, 715/839, 965, 763, 765, 742
  See application file for complete search history.

(56) References Cited

U.S. PATENT DOCUMENTS 5,412,400 A * 5/1995 Takahara et al. ............ 715/788
5,892,939 A   4/1999 Call et al.
6,853,920 B1 * 2/2005 Hsiung et al. ................. 702/1

FOREIGN PATENT DOCUMENTS

| EP | 0 813 129 A2 | 12/1997 |
| JP | 01-144193 | 6/1989 |
| JP | 07-021075 | 1/1995 |
| JP | 08-180084 | 7/1996 |
| WO | WO 01/31285 A2 | 5/2001 |

* cited by examiner

*Primary Examiner*—Cao (Kevin) Nguyen
(74) *Attorney, Agent, or Firm*—Morgan & Finnegan LLP

(57) ABSTRACT

A industrial equipment can easily change display contents and setting contents. In the industrial equipment, a display setting unit which makes a screen display does not hold data for the screen display. According to an operation instruction from an operator, the display setting unit reads a corresponding display data file, generates screen data based on the display data file, and displays the data. The display contents and the setting contents can be changed by changing a corresponding display data file only.

15 Claims, 10 Drawing Sheets

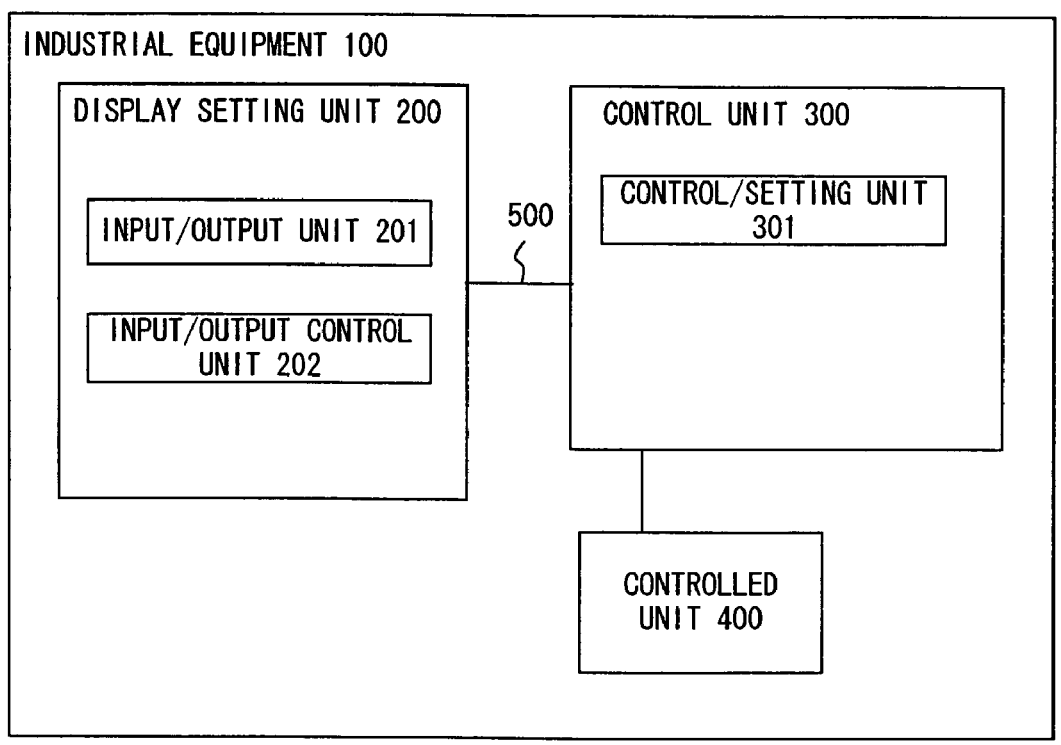
F I G. 1

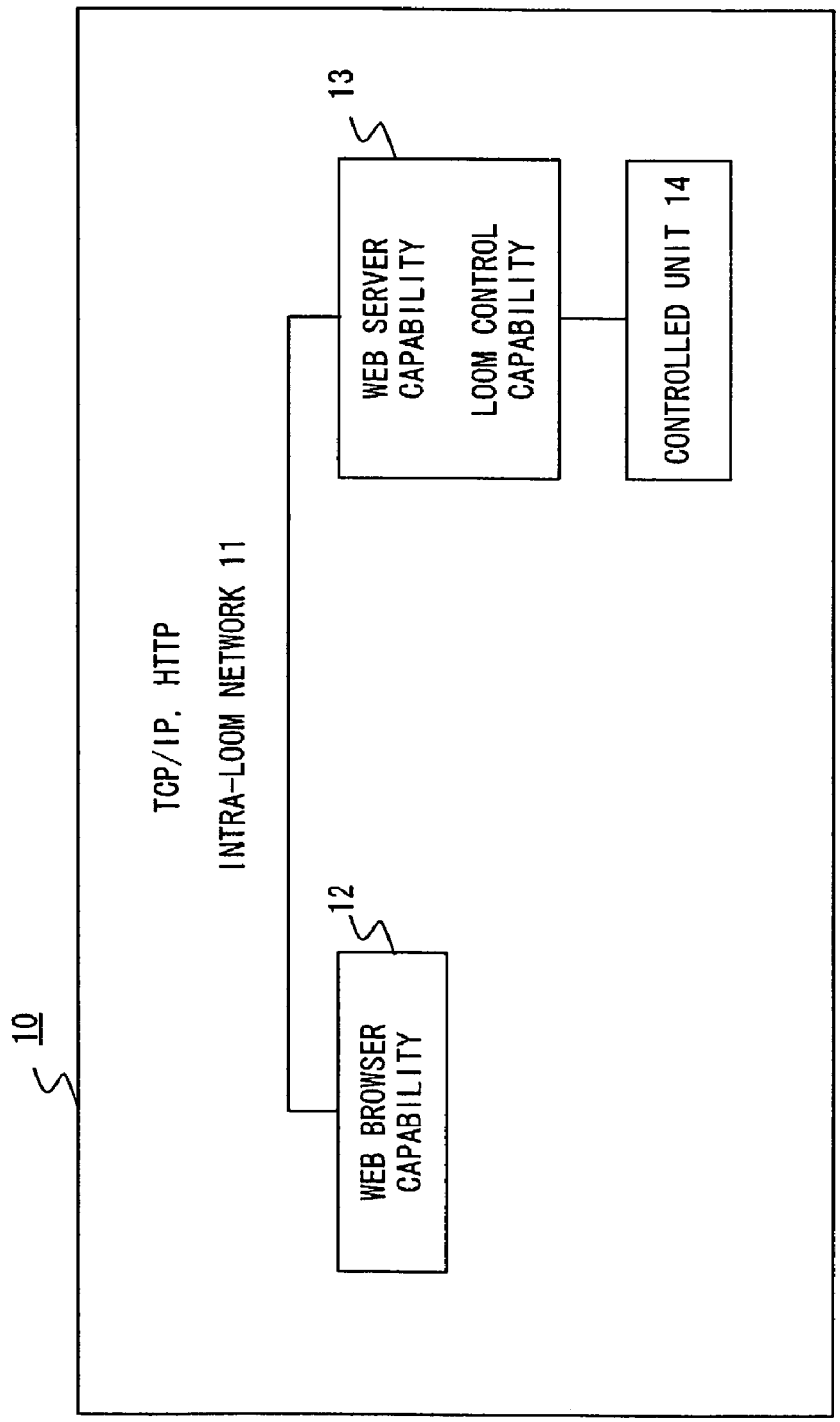
F I G. 5

FIG. 9

[NOW JULY 15 SAT SHIFT A  00:00 ~ 04:45]

LISTING

| | TIMES | MINUTS | | TIMES/h |
|---|---|---|---|---|
| WARP ERROR | 2 | 14 | NOW 96a | 0.52 |
| END ERROR | 0 | 0 | 24H 96b | 0.00 |
| BRIM ERROR R | 0 | 0 | | 0.00 |
| BRIM ERROR L | 2 | 0 | SHIFT A 96c | 0.00 |
| WF1 ERROR (1) | 1 | 1 | | 0.00 |
| WF1 ERROR (2) | 0 | 0 | SHIFT B 96d | 0.00 |
| WF2 ERROR (1) | 0 | 0 | | 0.00 |
| WF2 ERROR (2) | 0 | 0 | SHIFT C 96e | 0.00 |
| MANUAL STOP | 0 | 0 | | 0.00 |
| POWER SUPPLY OFF | | | | |
| OTHERS | 0 | 0 | | 0.00 |
| TOTAL | 5 | 15 | | 0.52 |

OPERATION TIME  4:30
DOWN TIME  0:15
OPERATING RATE  95.0%
AMOUNT OF PRODUCTION  109 p
4.7 m
5.2 y
(p=100pick)

SUN | MON | TUE | WED | THU | FRI | SAT

FIX WEAURM | CLOTH | EFFICIENCY | MONITOR | TIME

[ONE WEEK   JULY 8   SAT   SHIFT B ~ JULY 15   SAT   SHIFT A]

| | | TIMES | MINUTS | TIMES/h | |
|---|---|---|---|---|---|
| OPERATION TIME 147:54 | WARP ERROR | 113 | 792 | 0.76 | NOW — 96a |
| DOWN TIME 14:6 | END ERROR | 0 | 0 | 0.00 | 24 H — 96b |
| | BRIM ERROR R | 0 | 0 | 0.00 | WEEK — 96f |
| OPERATING RATE 91.3 % | BRIM ERROR L | 0 | 0 | 0.00 | |
| | WF1 ERROR (1) | 53 | 36 | 0.36 | SHIFT A — 96c |
| AMOUNT OF PRODUCTION | WF1 ERROR (2) | 49 | 18 | 0.33 | SHIFT B — 96d |
| 3383 p | WF2 ERROR (1) | 0 | 0 | 0.00 | SHIFT C — 96e |
| 143.2 m | WF2 ERROR (2) | 0 | 0 | 0.00 | |
| 156.7 y | MANUAL STOP | 0 | 0 | 0.00 | |
| | POWER SUPPLY OFF | | | | |
| | OTHERS | | | | |
| | TOTAL | 215 | 846 | 1.45 | |

( p = 100 pick )

[SUN] [MON] [TUE] [WED] [THU] [FRI] [SAT]

FIG. 10

INDUSTRIAL EQUIPMENT AND SYSTEM

BACKGROUND OF THE INVENTION

1. Field of the Invention

The present invention relates to industrial equipment connected to a network, and more specifically to the system of displaying and setting the industrial equipment.

2. Description of the Related Art

In the industrial equipment used in the process of manufacturing producing equipment, such as a machine tool, measurement/check equipment, etc., various setting values are set directly from the industrial equipment in the processing field or through a network. And collected trend data and information indicating the operating state of the industrial equipment.

FIG. 1 is a block diagram of the configuration of the display setting portion of common industrial equipment.

In FIG. 1, industrial equipment 100 includes a display setting unit 200 acting as an interface with the operator who operates the equipment; a control unit 300 for setting and controlling a controlled unit 400; and the controlled unit 400 having the function of manufacturing and measuring equipment by actually performing a processing, measuring/checking operations, etc.

The display setting unit 200 includes an input/output unit 201 and an input/output control unit 202. The input/output unit 201 is a man-machine interface between an operator and the industrial equipment 100, and includes an input/output device such as a flat panel, a touch panel, etc. of liquid crystal, etc. The input/output control unit 202 is configured by a microcomputer, etc., displays a setting screen and an information display screen on the input/output unit 201 based on the firmware stored in the ROM, requests the control unit 300 to transmit data and to instruct the controlled unit 400 to make settings at an instruction of the operator issued on the display screen of the input/output unit 201 to input data.

The control unit 300 controls the controlled unit 400 by performing various settings for the controlled unit 400 at an instruction of the display setting unit 200, and returning various data of the controlled unit 400 at a request of the display setting unit 200.

FIG. 2 shows an operation in the industrial equipment 100 performed when the operator displays and outputs the information indicating the operating state of the industrial equipment 100 onto the display setting unit 200.

In FIG. 2, when the operator requests to check the operating state of the industrial equipment 100, the input/output control unit 202 issues an operation instruction on the setting screen of the input/output unit 201 for display of the information indicating the target operating state.

According to the operation of the operator, the input/output control unit 202 issues a transmission request to the control unit 300 to transmit corresponding data in a predetermined procedure. Upon receipt of the request, the control unit 300 transmits the corresponding data to the input/output control unit 202 in a predetermined procedure. Upon receipt of the data indicating the operating state, the input/output control unit 202 generates display screen data according to the received data and the data stored in the ROM of the input/output control unit 202, and displays the data on the input/output unit 201.

As described above, in the industrial equipment 100, when various settings are made and the operating state of the industrial equipment 100 is checked, the operator perform an inputting operation through the display setting unit 200 provided for each industrial equipment 100 to issue instructions for settings and display. At this time, communications of data between the input/output control unit 202 of the display setting unit 200 and a control/setting unit 301 of the control unit 300 are established by communicating specific data to the industrial equipment such as binary data, etc. in a predetermined procedure through a dedicated line 500 according to the program stored by the input/output control unit 202 and the control/setting unit 301.

The contents of settings/display and the setting/displaying screen are to be flexibly and appropriately selected depending on the using environment, the skill level of the operator, etc. Since use frequencies of the contents of the setting and the contents of the display depend on the products, etc. processed by the industrial equipment 100, it is desired that they can be easily changed to improve the convenience.

However, in the common industrial equipment 100, when the contents of settings and the contents of display change because of the variations of the specification, etc., or when the screen display and the setting items change due to the products, the using environment, etc., the programs of the display setting unit 200 and the control/setting unit 301 have to be entirely changed. Therefore, the above mentioned change cannot be easily made.

Furthermore, when the industrial equipment 100 is newly developed, and the new model has a new function or new settings not obtained by the older models, the program for displaying the setting/displaying screen is to be newly prepared from the very beginning, thereby requiring the development cost.

SUMMARY OF THE INVENTION

The present invention aims at providing a industrial equipment capable of easily changing the contents of display and settings.

The industrial equipment according to the present invention is based on the configuration including a control unit for controlling a controlled unit, and a display setting unit for performing screen display.

The control unit includes a storage unit and a display data file group transmission unit.

The storage unit stores a plurality of display data file groups each configured by one or a plurality of files for which a display screen to be displayed on the display setting unit is defined.

The display data file group transmission unit transmits the display data file groups corresponding to the transmission request from the display setting unit in the above mentioned plurality of display data file groups to the display setting unit.

The display setting unit includes an input/output unit, a transmission request unit, and a display data generation unit.

The input/output unit display information on the screen.

The transmission request unit issues a transmission request for the display data file group corresponding to the operation instruction of the operator in the above mentioned plurality of display data file groups.

The display data generation unit generates display screen data by analyzing the data in the above mentioned display data file group transmitted from the control unit, and display the data on the input/output unit.

With the configuration, the contents of the display of the above mentioned input/output unit can be changed by only changing the display data file group stored in the storage unit of the control unit.

Furthermore, the industrial equipment can also be configured including an external network connection unit for connection to another industrial equipment through an external network.

With the configuration, the display setting unit can communicate data with the control unit of the other industrial equipment as with the control unit of the industrial equipment to which it belongs by configuring the communications of data between the display setting unit and the control unit to be established by the same protocol also for the external network.

Furthermore, by connecting the external network to a public line, the control units of various units of industrial equipment, the control unit of each industrial equipment can communicate information through the public line.

BRIEF DESCRIPTION OF THE DRAWINGS

FIG. 1 is a block diagram of the configuration of the display setting portion of common industrial equipment;

FIG. 5 shows an example of the configuration of a loom to which the present invention is applied;

FIG. 9 is the first view for explanation of an example of a variation of the second setting display screen; and FIG. 10 is the second view for explanation of an example of a variation of the second setting display screen.

DESCRIPTION OF THE PREFERRED EMBODIMENT

The embodiments of the present invention are described below by referring to the attached drawings.

Figure 2:
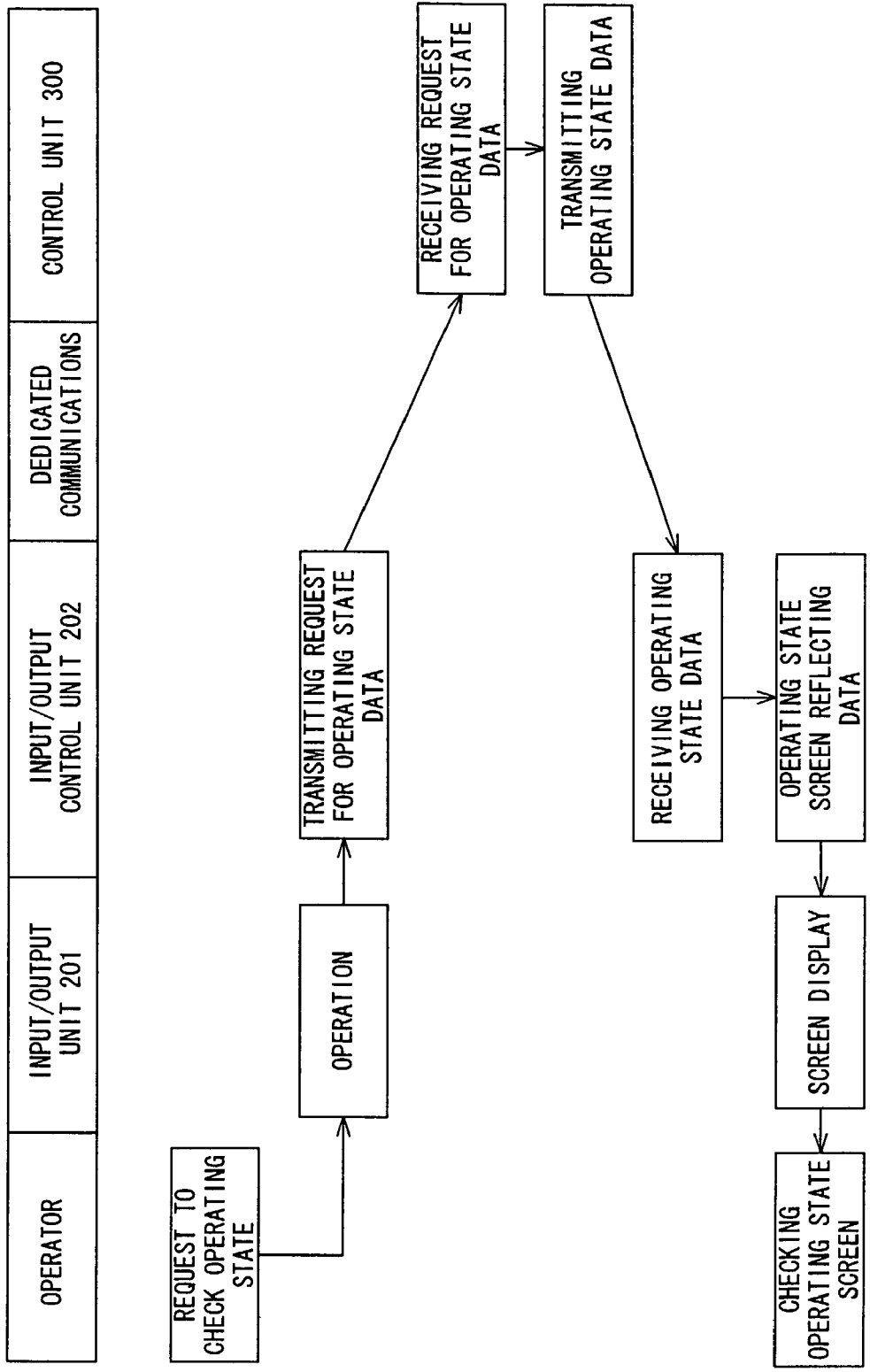
FIG. 2 shows the operations of the common industrial equipment performed when the information indicating the operating state is displayed and output.
Figure 3:
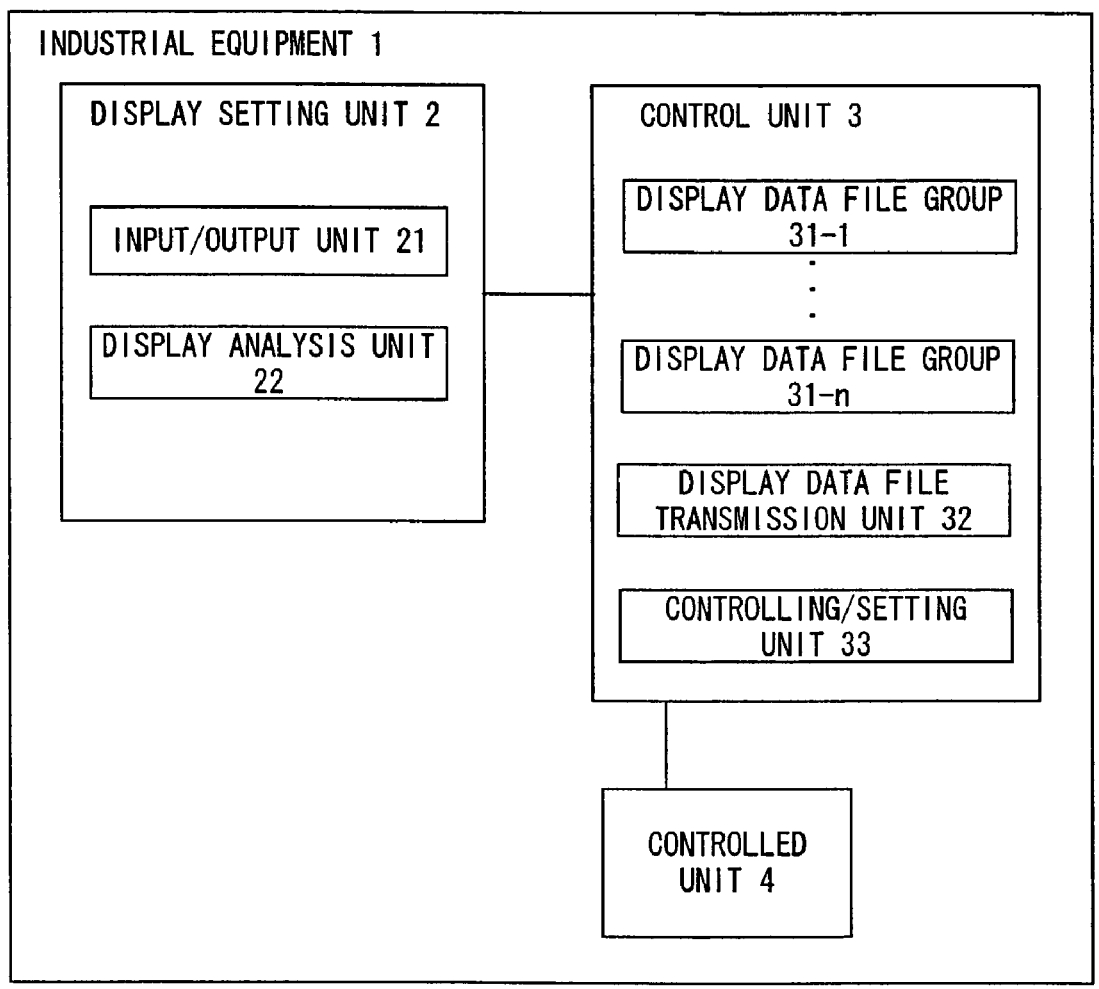
FIG. 3 shows the basic configuration of the industrial equipment according to an embodiment of the present invention.

FIG. 3 shows the basic configuration of the industrial equipment according to an embodiment of the present invention.

Industrial equipment 1 according to the present embodiment comprises a display setting unit 2, a control unit 3, and a controlled unit 4. The controlled unit 4 functions as the equipment for processing and producing products, and performing checking and measuring processes, and is substantially the same as the controlled unit 400 shown in FIG. 1.

The display setting unit 2 functions as a man-machine interface between the operator and the industrial equipment 1, and comprises a flat panel of liquid crystal, etc., a touch panel, etc. The operator inputs an operation instruction into the industrial equipment 1 through the display setting unit 2, and the industrial equipment 1 displays the instruction on the screen of the display setting unit 2, thereby notifying the operator of the instruction.

In the industrial equipment 1 shown in FIG. 3, the display setting unit 2 does not hold screen display data, but reads the data (herein after display data file group 31) for the corresponding display screen from the control unit 3 at an operation instruction from the operator, generates screen data based on the read data, and displays according to the generated data. This point is a feature of the industrial equipment 1.

When the display setting unit 2 displays the operating state of the industrial equipment 1, the setting screen, etc., it reads the corresponding display data file group 31 from the control unit 3, analyzes the data in the read file by a display analysis unit 22, generates display screen data, and displays the data on the input/output unit 21. The display data file group 31 comprises one or a plurality of files for which the display screen configuration and the display contents to be displayed on the input/output unit 21 are defined based on the widely recognized rules (for example, HTTP (HyperText Transfer Protocol), HTML (HyperText Markup Language), etc.). Therefore, the display setting unit 2 reads a corresponding file from a plurality of display data file groups 31-1 through 31-n stored and held in the control unit 3 at an operation instruction of the operator, analyzes the file according to the rules, generates display data, and displays the generated data.

The control unit 3 monitors and controls the controlled unit 4, and performs various setting processes on the controlled unit 4. The control unit 3 comprises: a controlling/setting unit 33 for controlling the controlled unit 4 at an instruction from the display setting unit 2; and a display data file transmission unit 32 for storing a sample of screen data displayed on the input/output unit 21 as the display data file group 31, and transmitting the display data file group 31 or the data obtained by adding the information indicating the state of the controlled unit 4 to the display data file group 31 to the display setting unit 2 in response to the request from the display setting unit 2. The display data file group 31 includes a data file described in a standardized page description language such as the HTML, XML (extensible Markup Language), etc., and a file of image data, etc. associated with the data file, and its display screen configuration and display contents to be displayed on the input/output unit 21 are defined.

According to the present embodiment, the control unit 3 can be realized with the configuration in which the display data file group 31 is stored in the ROM, but the contents of screen display and the setting contents can be flexibly changed by rewriting the display data file group 31 as necessary if the display data file group 31 is configured to be stored on a easily rewritten storage medium such as a hard disk, flash memory, etc.

Figure 4:
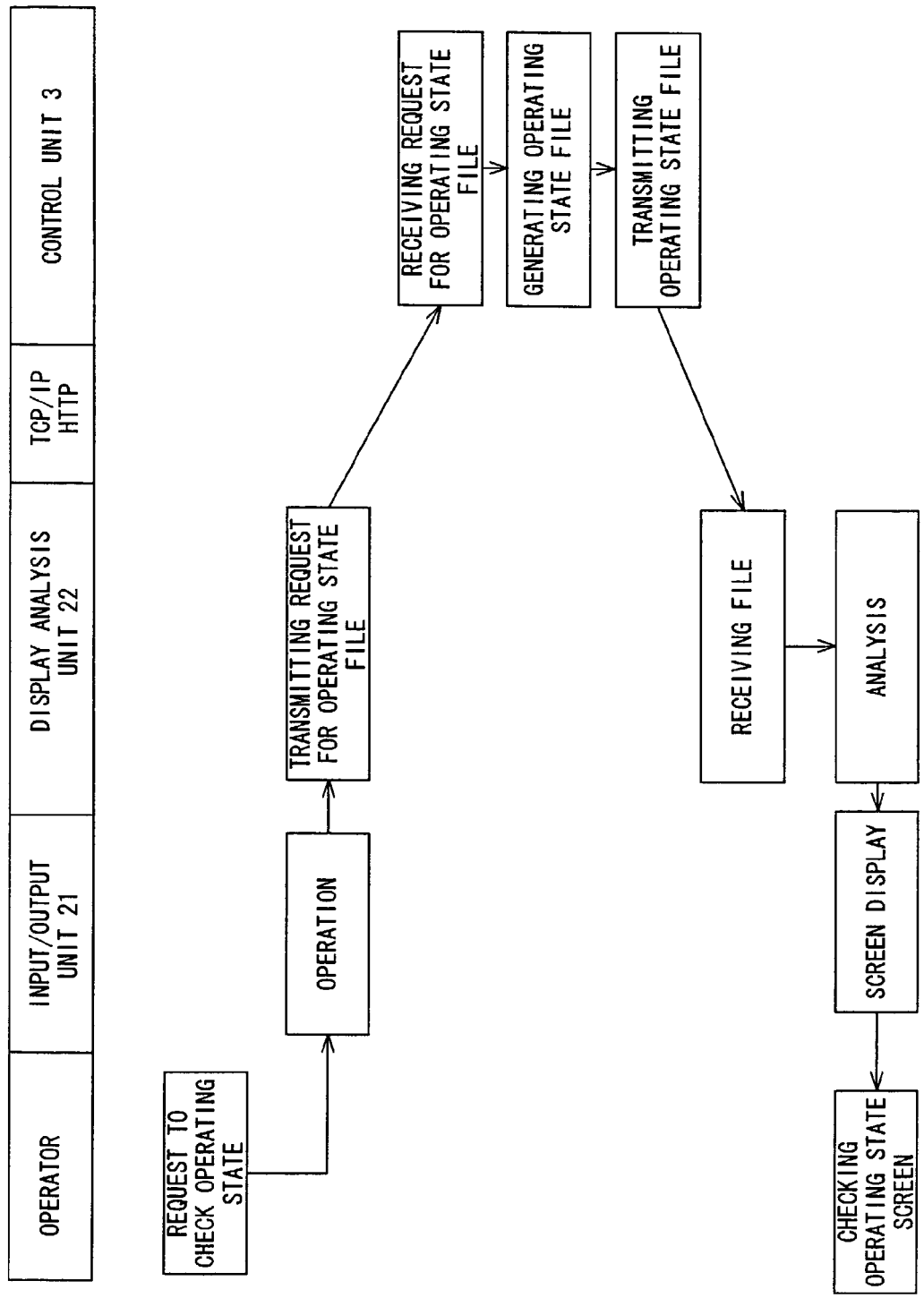
FIG. 4 shows the operations in the industrial equipment performed when the operator displays and outputs to the display setting unit necessary information for the industrial equipment.

FIG. 4 shows the operations in the industrial equipment 1 performed when the operator displays and outputs necessary information for the industrial equipment to the display setting unit 2.

In FIG. 4, when the information indicating the state of the industrial equipment 1 is to be displayed to check the operating state of the industrial equipment 1, the operator issues an operation instruction on the screen of the display setting unit 2 to display the information indicating the target operating state.

Based on the operation instruction of the operator, the display analysis unit 22 instructs the control unit 3 to transmit data on the corresponding display screen (screen indicating the operating state). Upon receipt of the request, the control unit 3 transmits the corresponding data in the display data file groups 31-1 through 31-n to the display analysis unit 22. If the transmitted display data file group 31 is associated with the file of the trend data (graph, etc.)

indicating the operating state, the control unit 3 generates the file and transmits it together with the display data file group 31 to the display analysis unit 22.

The display analysis unit 22 analyzes the received display data file group 31, etc., determines the screen layout, generates the display data, and displays the screen showing the operating state on the input/output unit 21. The display screen of the display data file group 31 has a link to another display data file group 31. When the operator specifies the next display/setting screen by pressing the operation button, etc. on the screen, the display data file group 31 corresponding to the display/setting screen is notified by the display analysis unit 22 to the control unit 3, and is read and then similarly analyzed and displayed on the screen. In the case of the setting screen on which a setting instruction is issued to the controlled unit 4, the display data file group 31 on the corresponding display screen is linked to the program for receiving the operator's setting of the operation instruction to issue the setting instruction to the controlled unit 4. The display analysis unit 22 transmits the operation instruction to the control unit 3, and specifies the corresponding setting program. Thus, in the control unit 3, the setting program instructs the display data file transmission unit 32 to perform the setting process on the controlled unit 4.

Thus, in the industrial equipment 1 according to the present embodiment, the display setting unit 2 for communicating with a user does not hold the information about the display screen, the display screen is prescribed by the display data file group 31 stored in the control unit 3, the display setting unit 2 reads the corresponding display data file group 31 from the control unit 31 when the display setting unit 2 make a screen display, and the display analysis unit 22 analyzes the display screen and the display layout to make a screen display. Therefore, the contents and the screen layout to be displayed can be changed only by rewriting the contents of the display data file group 31 without changing the display setting unit 2.

If the display data file group 31 is configured to be described in the standardized page description language such as the HTML, XML, etc., common browser software having the function of analyzing and displaying the screen configuration and the display contents from the description in these page description languages can be applied as is to the display analysis unit 22 of the display setting unit 2. Furthermore, in this case, the TCP/IP (transmission control protocol/Internet Protocol) is used for connection between the display setting unit 2 and the control unit 3, and the HTTP is used for transmission of the display data file group 31. Thus, the control unit 3 can be provided with the interface of the TCP/IP so that a general-purpose personal computer can be connected to the interface and used as the display setting unit 2. Otherwise, a telephone having the function for connection to the public line such as Internet, etc. can be network-connected to the control unit 3 so that the state of the industrial equipment 1 can be freely checked, or various setting instructions can be issued to the industrial equipment 1 externally from outside the facilities in which the industrial equipment 1 is mounted.

Described below is an example of realizing the present invention by applying the technology using the TCP/IP to a loom as a practical application example. In the explanation below, a loom is an example of industrial equipment. However, the present invention can also be applied to the general textile machinery including looms, spinning machines, and other textile manufacturing equipment, and other producing equipment and measuring equipment such as machine tools, etc.

FIG. 5 shows an example of a configuration to which the present invention is applied to a loom.

A loom 10 shown in FIG. 5 uses a TCP/IP as an intra-loom network 11 for connection between the display setting unit 12 and the control unit 13 in the loom. The control unit 13 stores and holds the screen data displayed on the display setting unit 12 as the data file described in the HTML. With the configuration, the relationship between the display data of the respective display screens is stored as the hyperlink embedded in the HTML file, and the display setting unit 12 reads the corresponding HTML file from the control unit 13 according to the hyperlink when the operator issues an operation instruction by pressing a button, etc.

With the configuration, the control unit 13 has the function of a Web server for transferring data of the corresponding HTML file, etc. in response to the information transfer request transmitted from the intra-loom network 11 in the format of the URL specification, etc. in addition to the function of setting and controlling a controlled unit 14 for management of textile production and controlling the loom to monitor the operations. The display setting unit 12 has the function of a Web browser for requesting the control unit 13 to transfer information, and makes a screen display according to information in the HTML file returned from the control unit 13 by the HTTP through the intra-loom network 11.

Figure 6:
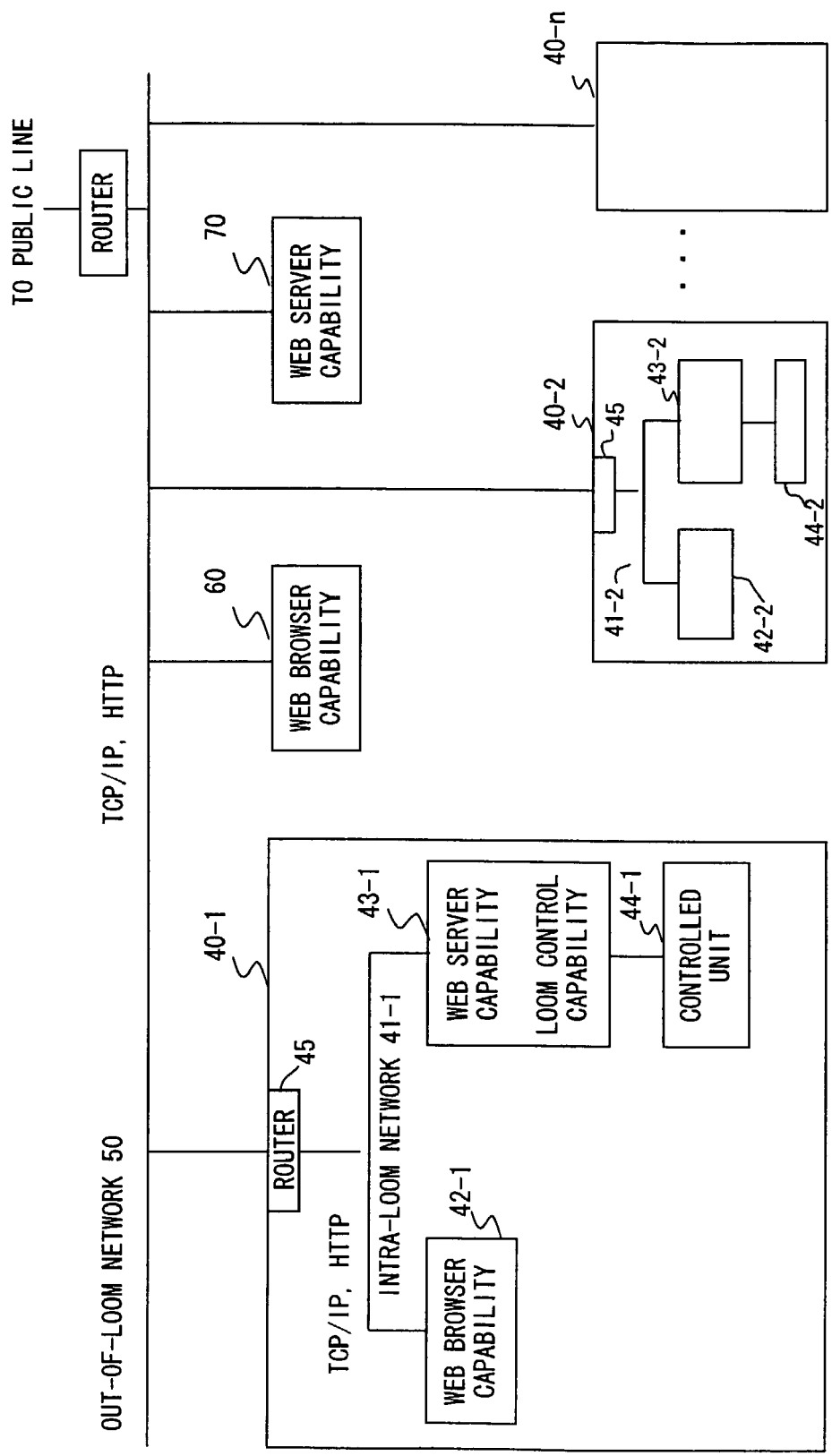
FIG. 6 shows an example of a configuration when a plurality of looms are connected through a network.

FIG. 6 shows an example of the configuration of the system which connects a plurality of looms through the network. In the system shown in FIG. 6, a plurality of looms 40-1 through 40-n belonging to the system can be centrally managed by communicating data among the plurality of looms 40-1 through 40-n through a network 50.

With the configuration shown in FIG. 6, the out-of-loom network 50 which connects each of the looms 40-1 through 40-n and an intra-loom network 41 for connecting internal units forming a loom 40 are networks having the TCP/IP as a protocol, and each of the looms 40-1 through 40-n comprises the intra-loom network 41, a display setting unit 42, a control unit 43, a controlled unit 44, and an internal router 45 for relay between the intra-loom network 41 in the loom and the out-of-loom network 50.

With the configuration, the display setting unit 42 and the control unit 43 in each of the looms 40-1 through 40-n accesses another loom 40 through the out-of-loom network 50 in the same procedure as in accessing the display setting unit 42 and the control unit 43 by specifying the a URL and an IP address, thereby checking the operating state and changing the setting contents. The internal router 45 can also be configured to be provided outside the loom 40. However, considering the manageability, it is desired to be provided inside the loom 40. Additionally, the internal router 45 can be configured to be realized as a function of the control unit 43, not as an independent unit.

A display unit 60 only having the function of setting a display for each of the looms 40-1 through 40-n can be connected to the out-of-loom network 50. The display unit 60 has the function of a Web browser, directly issues a transmission request for information to the control unit 43 of each loom 40 by specifying the URL and the IP address, and makes a screen display according to the received information. Upon receipt of the request, the control unit 43 transmits the corresponding information to the display unit 60 as in receiving a transmission request from the display setting unit 42 in the industrial equipment to which itself belongs.

The out-of-loom network 50 can also be configured to connect a scanner 70 for periodically collecting and accumulating information about the operating state of each of the looms 40-1 through 40-n. The scanner 70 periodically collects the information about the operating state, etc. from the looms 40-1 through 40-n managed by the scanner 70, and stores and accumulates the collected data. When the operating state of the entire system is to be checked, the operator requests the scanner 70 to transmit information by specifying the URL and the IP address through the display setting unit 42 of each loom 40 and/or the display unit 60, and the scanner 70 returns the corresponding data to the source of the request in the same format as the display data file group (HTML file). Then, the source of the request makes a screen display according to the received information.

The out-of-loom network 50 can also be configured to be connected to an external router 80 for network-connection of a public line. Thus, the external connection terminal outside of the facility in which the loom is mounted, can be connected to the out-of-loom network 50 through a public line, and the operating state of each loom 40 can be checked and various settings can be made from outside the facility. Especially, according to the present embodiment, since each control unit 43 having the function of the Web server and the scanner 70 store the information for generation of a display/setting screen and an information display screen in the HTML file format, the connection terminal for connection from the public line to the out-of-loom network 50 can be of any type as far as it has the function of a general-purpose Web browser. Additionally, it is obvious that the display setting unit of the loom can access the Web server (home page) on the public line (network) represented by Internet.

Figure 7:
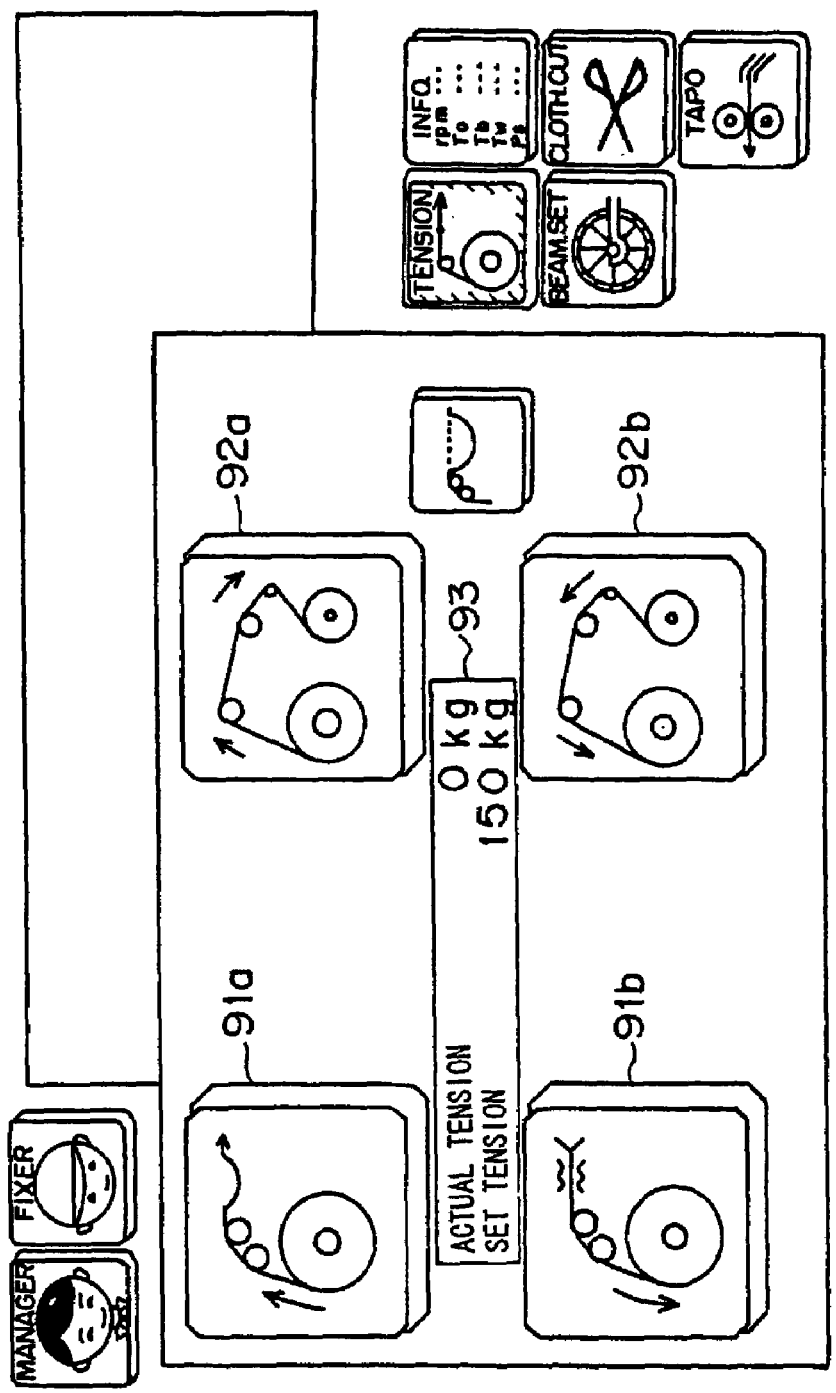
FIG. 7 is the first view for explanation of an example of a variation of the contents of the setting display screen.
Figure 8:
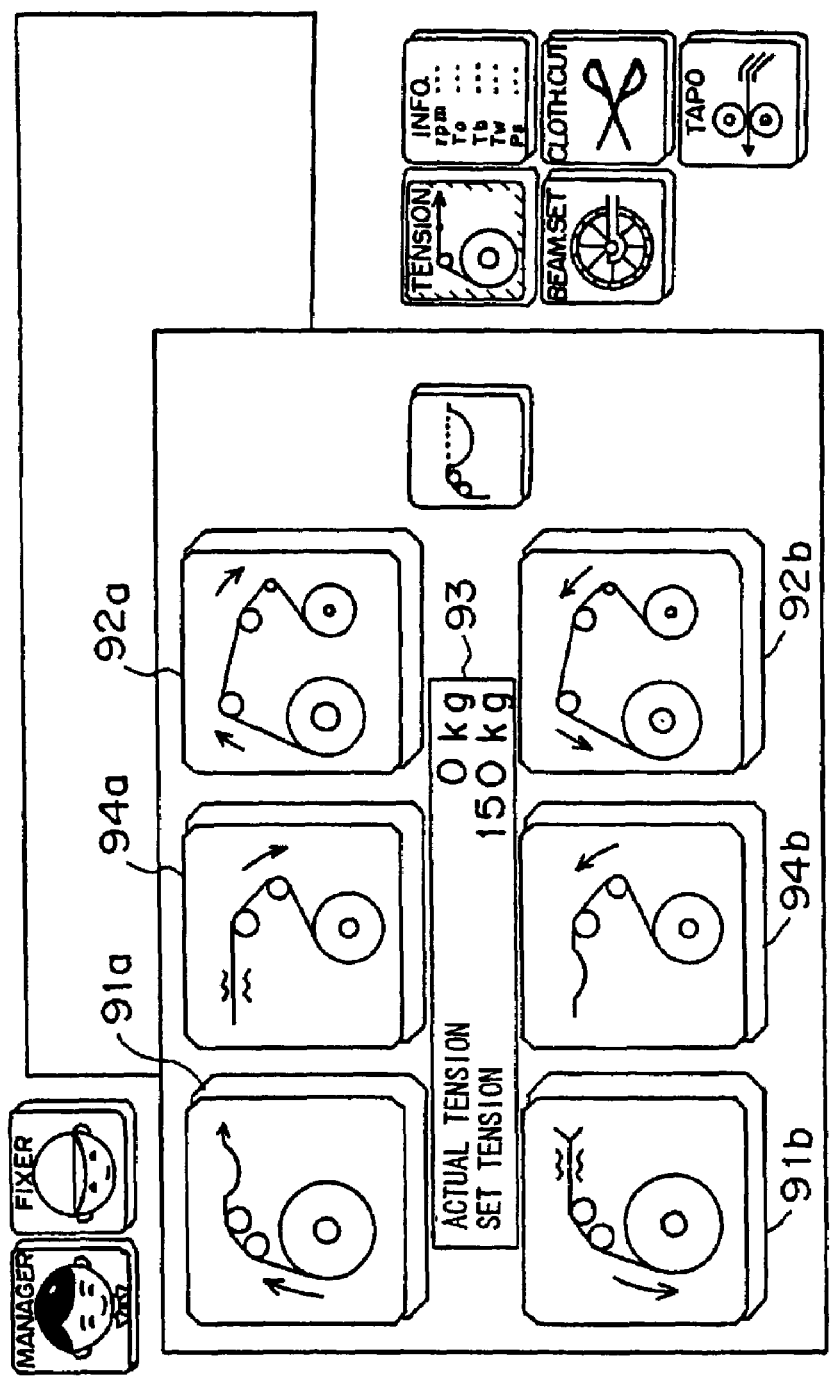
FIG. 8 is the second view for explanation of an example of a variation of the contents of the setting display screen.

FIGS. 7 and 8 show the amendments to the setting display screen displayed on the display setting unit in the industrial equipment according to the present embodiment.

FIG. 7 shows an example of a setting screen of the tension of the yarn on a loom. In FIG. 7, a button 91a is an operation button for reducing the tension of the yarn by turning the feeding portion in the forward direction, and a button 91b is an operation button for increasing the tension of the yarn by turning the feeding portion in the reverse direction. A button 92a is an operation button for turning the feeding portion and the take-up portion in the forward direction, and a button 92b is an operation button for turning them in the reverse direction. The operator handles these buttons while checking the tension of the yarn displayed on a tension display unit 93, thereby obtaining the appropriate tension.

Assume that the function of adjusting the tension of the yarn by turning it in the forward/reverse direction only for the take-up portion is added on the setting screen shown in FIG. 7. In the case of the general industrial equipment as shown in FIG. 1, the program for screen display, the data transfer program from the display setting unit 200 to a control unit 300, the data reception program from the display setting unit 200 and the program for controlling a controlled unit 400 according to the received data, stored in the ROM of the control unit 300, stored in the ROM of the display setting unit 200, are to be changed.

On the other hand, to change the screen display as FIG. 8 according to the industrial equipment of the present embodiment, the HTML file stored in the control unit 3 defining the screen shown in FIG. 7 is to be changed, and a operation button 94a for turning the take-up portion in the forward direction and a operation button 94b for turning it in the reverse direction. The operation buttons 94a and 94b are associated with the newly generated control program for controlling the turn if the take-up portion of the control unit 3 in the forward/reverse direction using the CGI, and the operation buttons 94a and 94b are pressed to activate the control program.

Thus, In the industrial equipment according to the present embodiment, there is not need to make any change to the display setting unit 2, but it is only necessary to make a minimal change to the program/data in the control unit 3 when the setting contents are changed to, for example, newly add a function.

In the process of make a change in the control unit 3, for example, when a change is made as the example described above, an amendment is to be made to the HTML file for which the screen layout shown in FIG. 7 is set in the existing data/program, and other programs or data can be used as is, that is, without no amendments, thereby easily changing the setting contents and display contents.

FIGS. 9 and 10 show the second example of changing a setting display screen.

FIG. 9 shows an example of a display screen indicating the total value of the cause of the stop of the loom. FIG. 9 shows the cause of system down and the frequency, the downtime for the cause, and the frequency per unit time as the final result on July 15 at the shift A in a plurality of shifts (switches).

On the setting screen shown in FIG. 9, five operation buttons 96a through 96e, that is, 'NOW', '24H', 'shift A', 'shift B', and 'shift C', are operated and switched to select and display the total data in the current shift, the total data as one-day data, and the total data at the respective shifts A, B, and C in the 3-shift system.

On the display screen shown in FIG. 9, when the new function of displaying the total data for one week is to be added, the HTML file in which the display layout shown in FIG. 9 is set in the display data file group 31 is changed according to the industrial equipment of the present embodiment, a display button 96f indicating the display of the one-week total data and the link to the HTML file for setting the display screen (the display screen shown in FIG. 10) are added, and the display data file group 31 for the display of the display screen shown in FIG. 10 is to be newly generated.

When the 'week' button 96f for display of the one-week total data newly added on the display screen shown in FIG. 9 is selected on the screen, a request to transmit the display data file group 31 corresponding to the display screen shown in FIG. 10 is issued from the display setting unit 2 to the control unit 3, and is displayed on the screen.

Thus, in the industrial equipment according to the present embodiment, the display contents can be easily changed only by rewriting the display data file group 31 stored in the control unit 3. In addition, if the display data file group 31 is configured to be stored on a storage medium for easily rewriting the data, then a convenient industrial equipment can be realized by rewriting the display data file group 31 depending on the various conditions such as the environment in which the industrial equipment is mounted, the use style, the production item, the skill of the operator, etc.

The display data file group 31 can be rewritten from the display setting unit 2 of each industrial equipment, from the display setting unit 2 of another industrial equipment and the loom 40 through the network connecting industrial equipment with another equipment such as the out-of-loom network 50 shown in FIG. 6, or externally from outside the facility through a public line. When the display data file group 31 is rewritten through a network for connecting plural pieces of industrial equipment, the display data file groups 31 of the plural pieces of industrial equipment can be simultaneously rewritten. In this case, plural pieces of industrial equipment can be simultaneously changed.

As described above in detail, the industrial equipment according to the present invention can easily change the display contents and the setting contents. Therefore, since the display contents and the setting contents can be easily changed depending on the use conditions, etc. of the industrial equipment, thereby successfully improving the convenience of the industrial equipment.

Furthermore, when the display contents and the setting contents are changed, only the information stored in the control unit is to be changed, and there is no need to change the data in the display setting unit.

Additionally, since the display data for the existing display screen can be used as is, an efficient development can be performed.

In addition, by generating the display data to be displayed on the screen in the standard page description language, any general-purpose terminal not having a special capability can be used so far as the display setting unit can interpret the page description language and the data can be displayed on the display setting unit. Therefore, various information such as the operating state, etc. of the industrial equipment, etc. can be browsed and the settings can be changed by issuing an instruction through a public line externally from the facility in which the industrial equipment is mounted.

What is claimed is:

1. Industrial equipment having a control unit for controlling a controlled unit, and a display setting unit for making a screen display, wherein:
    said control unit comprises:
    a storage unit storing a plurality of display data file groups configured by one or a plurality of files in which a display screen displayed on said display setting unit is defined according to a predetermined rule; and
    a display data file group transmission unit transmitting a display data file group corresponding to a transmission request from said control unit in the plurality of display data file groups to said display setting unit; and
    said display setting unit comprises:
    an input/output unit displaying information on a screen;
    a transmission request unit issuing the transmission request for a display data file group corresponding to an operation instruction of an operator in the plurality of display data file groups; and
    a display data generation unit generating a display screen data by analyzing data in the display data file group transmitted from said controlled unit according to the predetermined rule, and displaying the data on said input/output unit.

2. The equipment according to claim 1, further comprising an external network connection unit for connection of another industrial equipment through an external network.

3. The equipment according to claim 2, wherein said display setting unit communicates data with said control unit using the same protocol as said external network.

4. The equipment according to claim 3, wherein said protocol is a Transmission Control Protocol/Internet Protocol and Hypertext Transfer Protocol, and said display data file group includes data described in a HyperText Markup Language.

5. The equipment according to claim 2, wherein said transmission request unit issues the transmission request to the control unit of the other industrial equipment through the external network.

6. The equipment according to claim 2, wherein external network is connected with a public line, and said display data file group transmission unit transmits a corresponding display data file group in response to a transmission request through the public line.

7. The equipment according to claim 6, wherein said external network comprises the same protocol as said public line.

8. The equipment according to claim 1, wherein said display data file group stored in said storage unit can be rewritten.

9. Industrial equipment having a control unit for controlling a controlled unit, and a display setting unit for making a screen display, wherein:
    said control unit comprises:
    storage means for storing a plurality of display data file groups configured by one or a plurality of files in which a display screen displayed on said display setting unit is defined according to a predetermined rule; and
    display data file group transmission means for transmitting a display data file group corresponding to a transmission request from said control unit in the plurality of display data file groups to said display setting unit; and
    said display setting unit comprises:
    input/output means for displaying information on a screen; transmission request means for issuing the transmission request for a display data file group corresponding to an operation instruction of an operator in the plurality of display data file groups; and
    display data generation means for generating a display screen data by analyzing data in the display data file group transmitted from said controlled unit according to the predetermined rule, and displaying the data on said input/output means.

10. A system having plural pieces of industrial equipment and a network for connection of the plural pieces of industrial equipment, wherein:
    each of said plural pieces of industrial equipment comprises a control unit for controlling a controlled unit and a display setting unit for making a screen display;
    said control unit comprises:
    a storage unit storing a plurality of display data file groups configured by one or a plurality of files in which a display screen displayed on said display setting unit is defined according to a predetermined rule; and
    a display data file group transmission unit transmitting a display data file group corresponding to a transmission request from said control unit in the plurality of display data file groups to said display setting unit; and
    said display setting unit comprises:
    an input/output unit displaying information on a screen;
    a transmission request unit issuing the transmission request for a display data file group corresponding to an operation instruction of an operator in the plurality of display data file groups; and
    a display data generation unit generating a display screen data by analyzing data in the display data file group transmitted from said controlled unit according to the predetermined rule, and displaying the data on said input/output unit.

11. The system according to claim 10, further comprising a line connection unit connecting the network with a public line.

12. The system according to claim 10, further comprising a display unit which is connected to the network and comprises the display setting unit.

13. The system according to claim 10, further comprising a scanner unit which is connected to the network and periodically collects and accumulates information indicating an operating state of each industrial equipment.

14. The system according to claim 13, wherein said transmission request unit of the industrial equipment requests said scanner unit to transmit information indicating the operating state, and said scanner unit returns requested data in response to the transmission request as the data in the same format as the display data file group.

15. A system having plural pieces of industrial equipment and a network for connection of the plural pieces of industrial equipment, wherein:

each of said plural pieces of industrial equipment comprises a control unit for controlling a controlled unit and a display setting unit for making a screen display;

said control unit comprises:

storage means for storing a plurality of display data file groups configured by one or a plurality of files in which a display screen displayed on said display setting unit is defined according to a predetermined rule; and display data file group transmission means for transmitting a display data file group corresponding to a transmission request from said control unit in the plurality of display data file groups to said display setting unit; and said display setting unit comprises:

input/output means for displaying information on a screen;

transmission request means for issuing the transmission request for a display data file group corresponding to an operation instruction of an operator in the plurality of display data file groups; and display data generation means for generating a display screen data by analyzing data in the display data file group transmitted from said controlled unit according to the predetermined rule, and displaying the data on said input/output means.

* * * * *

UNITED STATES PATENT AND TRADEMARK OFFICE
CERTIFICATE OF CORRECTION

| | | |
|---|---|---|
| PATENT NO. | : 7,036,084 B2 | Page 1 of 1 |
| APPLICATION NO. | : 10/174382 | |
| DATED | : April 25, 2006 | |
| INVENTOR(S) | : Toshiharu Miwa et al. | |

It is certified that error appears in the above-identified patent and that said Letters Patent is hereby corrected as shown below:

On the Title page

(56) References Cited

Please add --

Other Documents

Kinoshita, et al. "Development of Internet TTCS", Toyota Jidoshokki Technical Report, No. 41, July 2000, pp. 45-48. --

Signed and Sealed this

Fourth Day of September, 2007

JON W. DUDAS
*Director of the United States Patent and Trademark Office*